United States Patent [19]
Macbeth

[11] 3,928,965
[45] Dec. 30, 1975

[54] ROCKET MOTOR CONSTRUCTION
[75] Inventor: Albert W. Macbeth, Brigham City, Utah
[73] Assignee: Thiokol Corporation, Newtown, Pa.
[22] Filed: June 27, 1975
[21] Appl. No.: 591,227

Related U.S. Application Data
[62] Division of Ser. No. 413,477, Nov. 7, 1973.

[52] U.S. Cl. .................. 60/255; 60/39.47; 102/103
[51] Int. Cl.² ........................................... F02K 9/04
[58] Field of Search.................. 60/253, 255, 39.47; 102/103

[56] References Cited
UNITED STATES PATENTS

| | | | |
|---|---|---|---|
| 2,957,309 | 10/1960 | Kobbeman | 60/255 |
| 3,009,385 | 11/1961 | Burnside | 60/255 X |
| 3,108,433 | 10/1963 | De Fries et al. | 60/255 |
| 3,243,956 | 4/1966 | Hamm et al. | 60/255 |
| 3,407,595 | 10/1968 | Peterson | 60/255 |
| 3,426,528 | 2/1969 | Mangum et al. | 60/255 X |
| 3,700,762 | 10/1972 | Carpenter et al. | 102/103 |

Primary Examiner—Carlton R. Croyle
Assistant Examiner—Robert E. Garrett
Attorney, Agent, or Firm—Stanley A. Marcus; Edward E. McCullough

[57] ABSTRACT

A solid propellant grain for a rocket is encased in and bonded to an elastomeric insulation sheath. Stresses that would otherwise occur between the propellant grain and the rocket case as a result of differential expansion and contraction if the grain were bonded to the case are eliminated by an expandable bearing sleeve that is bonded to the elastomeric sheath but not to the case. The bearing sleeve is made of noncombustible material and is formed by overlapping helical windings of a continuous tape that permit longitudinal motion of the propellant grain relative to the rocket case. Since adjacent coils of the sleeve overlap, the rocket case is always protected from hot gases. Hence, the sleeve also functions as a part of the insulation for the rocket case.

5 Claims, 4 Drawing Figures

ROCKET MOTOR CONSTRUCTION

This invention was made under or during the course of Contract AF04(694)-926 with the U.S. Air Force.

CROSS REFERENCE TO RELATED APPLICATIONS

This is a divisional application of a copending application Ser. No. 413,477 "Rocket Motor Construction" by A. W. Macbeth, filed Nov. 7, 1973.

BACKGROUND OF THE INVENTION

This invention relates broadly to solid propellant rocket motors. Particularly, it relates to methods and apparatus for eliminating stresses ordinarily caused by differential expansion or contraction of the propellant grain and the case to which it is bonded.

A continuing problem with solid propellant rocket motors, particularly those of the end burning type, is that most solid propellants tend to shrink to a much greater degree than the rocket motor case to which they are customarily bonded, during their curing process and also when subjected to lowered ambient temperatures.

Conventional methods of obviating these stresses have included the use of a plurality of layers of insulation surrounding the propellant grain. These layers are bonded together and to the case of the rocket only at the forward end thereof to permit longitudinal movement of the propellant grain relative to the case as it shrinks or expands. An example of this system is shown in U.S. Pat. No. 3,108,433 to M. G. DeFries, et al. This method tended to add an unacceptable amount of inert weight to the rocket and to diminish the quantity of propellant that could be loaded into the case.

Another system, shown in U.S. Pat. No. 3,426,528 to Mangum, et al, shows an arrangement of hoop expansion joints (FIGS. 1 and 2) that permit a small amount of longitudinal movement of the propellant relative to rocket case. However, this movement cannot be cumulative from fore to aft, because each expansion joint is bonded to the case as well as to the propellant. FIGS. 3 and 4 of the same patent show means that permit radial motion of the propellant grain relative to the case, but, not longitudinal motion.

The present invention provides a solution to this problem by a means that is both lighter in weight and easier to manufacture, and that permits cumulative contraction of the propellant grain from fore to aft of the rocket.

SUMMARY OF THE INVENTION

In a solid propellant rocket motor, an elastomeric sheath of insulation is bonded to the surface of the solid propellant grain adjacent the rocket case. A bearing sleeve is bonded to the surface of this sheath, but not to the case, and is made of overlapping coils of tape that is helically wound upon the sheath; so that, as the propellant grain expands or contracts relative to the case, there are no gaps in the material between the sheath and the rocket case. Hence, the bearing sleeve not only permits longitudinal movement of the propellant grain relative to the rocket case, but also functions as part of the thermal insulation for the case.

The surfaces of the bearing sleeve that contact the rocket case may be coated with Teflon (polytetrafluoroethylene) or other lubricous material.

The invention is made by fitting the insulation sheath over a mandrel that has the same dimensions as would the propellant grain at the lowest ambient temperature for which it is intended. The tape, made of fiberglass impregnated with a cured resin, is wound upon the sheath and bonded thereto. The sheath is then removed from the mandrel, placed in the rocket case, bonded into the forward end dome thereof, stretched to an appropriate length, and filled with uncured propellant. The propellant is typically cured by being subjected to elevated temperatures.

Objects of the invention are to provide a means for eliminating stresses that may occur between a solid propellant rocket grain and its case; and to provide such a means that is easy to manufacture, light in weight, and reliable in operation. Important features of the invention are that the stress release mechanism also functions as a thermal insulation, and that it is made of readily available materials.

Other objects and features of the invention will become apparent as the following detailed description is read with reference to the accompanying drawings. Identical parts are designated by the same numbers throughout the disclosure.

DESCRIPTION OF THE PREFERRED EMBODIMENTS

Figure 1:
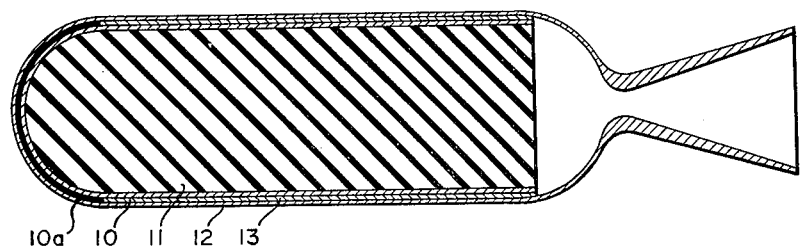
FIG. 1 is a longitudinal section of a typical, solid propellant rocket motor in which the invention is installed.

In the present invention, an elastomeric insulation sheath 10 is bonded to the propellant grain 11 and covers the surface thereof adjacent the rocket case 12. This sheath 10 is typically a high-temperature rubber, such as Buna-N rubber. The forward end portion 10a of the sheath 10 is bonded into the forward end of the rocket case 12. A bearing sleeve 13 is, in turn, bonded to the cylindrical surface of the elastomeric sheath 10. The bearing sleeve 13 is made, in the preferred embodiment, of fiber glass impregnated with a high-temperature resin, typically a phenolic.

Figure 2:
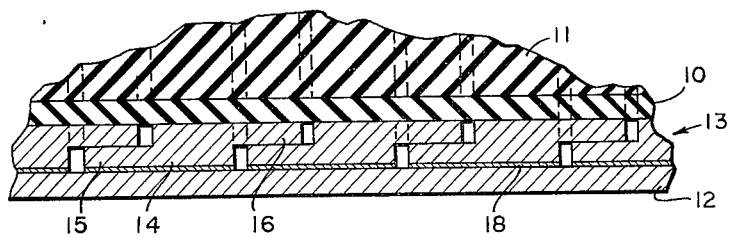
FIG. 2 is a longitudinal section, enlarged, of an edge portion of FIG. 1.
Figure 3:
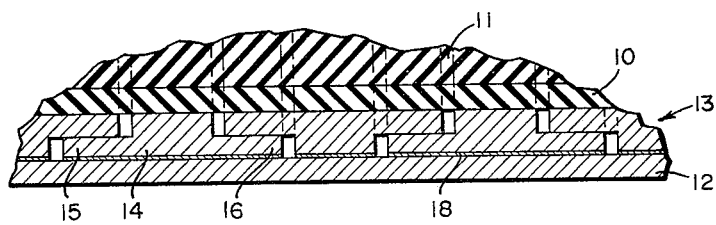
FIG. 3 is a longitudinal section similar to FIG. 2, but showing an alternative embodiment of the tape surrounding the insulation sheath.

The bearing sleeve 13 is formed by a series of overlapping coils of a helically wound tape 17. In cross section, as in FIG. 2, the coils of tape 17 appear as segments 14, each having a forwardly extending flange 15 and an aftwardly extending flange 16. These flanges 15 and 16 may extend from opposite sides of each segment 14 relative to the axis of the rocket, as shown in FIG. 2, so that all segments 14 are identical in cross section. Alternatively, they may extend from the same side in a "T" configuration so that each segment has the reverse image of its adjacent segments as shown in FIG. 3. Also, the segments 14 may be lateral mirror images of those shown in FIG. 2, or each segment 14 may have a plurality of flanges 15 and 16. The embodiment of the bearing sleeve 13 shown in FIG. 3 may be made by two tapes 17 wound side by side on the sheath 10, but one being axially rotated 180° to the other so that their adjacent flanges may overlap.

The thickness of each forward flange 15 plus each aft flange 16 equals that of its segment 14, so that each forward flange 15 may overlap the aft flange 16 of the adjacent segment 14 without leaving a gap. Also, as the segments 14 are moved apart by expansion of the propellant grain 11, there is never a longitudinal gap in the bearing sleeve 13. For this reason, the bearing sleeve 13 also functions as a part of the thermal insulation that protects the rocket case 12. If each segment 14 has a plurality of forward flanges 15 and aft flanges 16 (not shown), they are arranged to mesh with those of adjacent segments 14 in the manner of mortise joints.

The outer surface of the bearing sleeve 13 may be coated with Teflon (polytetrafluoroethylene) 18 or other material having suitable lubricity to facilitate movement of the propellant grain 11 relative to the rocket case 12.

Figure 4:
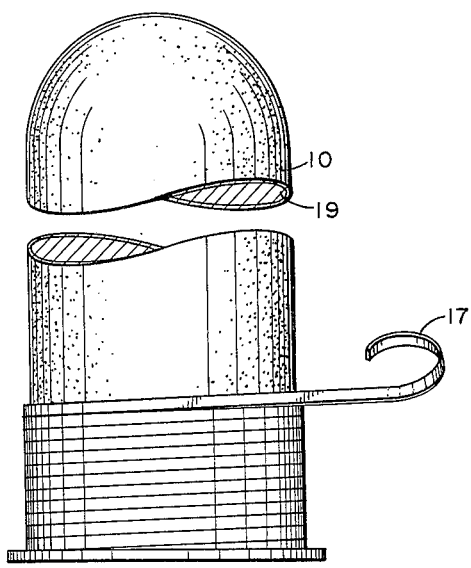
FIG. 4 is a side elevation of a mandrel showing the invention being manufactured thereon.

The invention may be manufactured in the following way: A mandrel 19 having the dimensions desired for the propellant grain at its lowest ambient operating temperature is formed from a mixture of polyvinyl alcohol and sand, and allowed to solidify (See FIG. 4). The elastomeric insulation sheath 10 is then placed over the mandrel 19, and the sheath 10 is coated with an adhesive composition. The bearing sleeve 13 is formed by winding the tape 17 thereon in a helical pattern as described above. Care is taken not to bond the segments 14 to each other. The sheath 10 is then removed from the mandrel 19, bonded at its forward end 10a into the end dome of the case 12, and stretched to receive the quantity of uncured propellant necessary to provide a propellant grain 11 of the desired size when cured and exposed to its lowest ambient temperature. It is then filled with propellant and placed in an oven where the propellant is cured at elevated temperatures.

An invention has been described that provides an advance in the art of rocket construction. Although the embodiments have been described with considerable specificity with regard to detail, it should be noted that details may be altered without departing from the scope of the invention as it is defined in the following claims.

The invention claimed is:

1. In a rocket motor that includes a case and a solid propellant grain therein, the improvement comprising:
    an elastomeric sheath surrounding and bonded to the propellant grain on surfaces thereof that are adjacent the case; and
    a bearing sleeve of noncombustible material surrounding and bonded to the elastomeric sheath but unbonded to the case, the bearing sleeve formed by overlapping, helical windings of a continuous tape upon the elastomeric sheath, whereby expansion and contraction of the propellant grain relative to the case are permitted without harmful stress.

2. The rocket motor of claim 1 wherein the tape has at least one flange extending from each forward and aft edge, and in staggered relationship, so that the flanges of adjacent coils of tape may overlap and mesh together.

3. The rocket motor of claim 1 wherein the tape is made of fiber glass impregnated with a resin.

4. The rocket motor of claim 1 wherein the elastomeric sheath is bonded into the rocket case at the forward end portion thereof.

5. The rocket motor of claim 1 wherein two continuous, adjacent tapes are wound on the elastomeric sheath, each having a forward flange directly opposite an aft flange to form a "T" configuration, one tape being axially rotated 180° to the other so that their adjacent flanges may overlap.

* * * * *